(12) United States Patent
Mazumder et al.

(10) Patent No.: US 10,350,708 B2
(45) Date of Patent: Jul. 16, 2019

(54) APPARATUS AND METHOD FOR DIRECT WRITING OF SINGLE CRYSTAL SUPER ALLOYS AND METALS

(71) Applicant: THE REGENTS OF THE UNIVERSITY OF MICHIGAN, Ann Arbor, MI (US)

(72) Inventors: Jyotirmoy Mazumder, Ann Arbor, MI (US); Jeongyong Choi, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/506,539

(22) PCT Filed: Aug. 24, 2015

(86) PCT No.: PCT/US2015/046531
§ 371 (c)(1),
(2) Date: Feb. 24, 2017

(87) PCT Pub. No.: WO2016/032953
PCT Pub. Date: Mar. 3, 2016

(65) Prior Publication Data
US 2017/0274476 A1   Sep. 28, 2017

Related U.S. Application Data

(60) Provisional application No. 62/041,884, filed on Aug. 26, 2014.

(51) Int. Cl.
*B23K 26/34* (2014.01)
*B23K 26/342* (2014.01)
(Continued)

(52) U.S. Cl.
CPC ........ *B23K 26/342* (2015.10); *B23K 26/0006* (2013.01); *B23K 26/034* (2013.01);
(Continued)

(58) Field of Classification Search
CPC .. B23K 26/342; B23K 26/144; B23K 26/346; B23K 26/006; B23K 26/0081;
(Continued)

(56) References Cited

U.S. PATENT DOCUMENTS 5,915,316 A * 6/1999 Tajima ............... B23K 26/0093
112/155
2004/0164059 A1* 8/2004 Brehm ................. B23K 1/0056
219/121.64

(Continued)

FOREIGN PATENT DOCUMENTS

EP    1637274 A1    3/2006

OTHER PUBLICATIONS

L.S. Langston, "Crown jewels," ASME Mechanical Engineering Magazine, Feb. 2006.
(Continued)

*Primary Examiner* — Brian W Jennison
(74) *Attorney, Agent, or Firm* — Harnes, Dickey & Pierce, P.L.C.

(57) ABSTRACT

A method and apparatus for direct writing of single crystal super alloys and metals. The method including heating a substrate to a predetermined temperature below its melting point; using a laser to form a melt pool on a surface of the substrate, wherein the substrate is positioned on a base plate, and wherein the laser and the base plate are movable relative to each other, the laser being used for direct metal deposition; introducing a superalloy powder to the melt pool; and controlling the temperature of the melt pool to maintain a predetermined thermal gradient on a solid and liquid inter- (Continued)

face of the melt pool so as to form a single crystal deposit on the substrate. The apparatus configured to generally achieve the aforementioned method.

19 Claims, 2 Drawing Sheets

(51) Int. Cl.
*B23K 26/354* (2014.01)
*B23K 26/03* (2006.01)
*B23K 26/08* (2014.01)
*B23K 26/70* (2014.01)
*B23K 26/144* (2014.01)
*B33Y 10/00* (2015.01)
*B33Y 30/00* (2015.01)
*B33Y 50/02* (2015.01)
*B33Y 80/00* (2015.01)
*B23K 26/00* (2014.01)
*C22F 1/10* (2006.01)
*B23K 26/346* (2014.01)
*B23K 101/00* (2006.01)
*B23K 103/08* (2006.01)
*B23K 103/18* (2006.01)
*B23P 15/04* (2006.01)

(52) U.S. Cl.
CPC ........ B23K 26/083 (2013.01); B23K 26/0861 (2013.01); B23K 26/0869 (2013.01); B23K 26/0884 (2013.01); B23K 26/144 (2015.10); B23K 26/34 (2013.01); B23K 26/346 (2015.10); B23K 26/354 (2015.10); B23K 26/702 (2015.10); B23K 26/703 (2015.10); B33Y 10/00 (2014.12); B33Y 30/00 (2014.12); B33Y 50/02 (2014.12); B33Y 80/00 (2014.12); C22F 1/10 (2013.01); *B23K 2101/001* (2018.08); *B23K 2103/08* (2018.08); *B23K 2103/26* (2018.08); *B23P 15/04* (2013.01)

(58) Field of Classification Search
CPC .......................... B23K 26/034; B23K 26/083; B23K 26/0884; B23K 35/0244; B23K 35/30; B23K 35/3033; B23K 2201/001; B23K 2203/50; B23K 2203/26; B33Y 10/00; B33Y 30/00; B33Y 50/02; B33Y 80/00
USPC ........................................................ 219/76.1
See application file for complete search history.

(56) References Cited

U.S. PATENT DOCUMENTS

| | | |
|---|---|---|
| 2004/0200816 A1 | 10/2004 | Chung et al. |
| 2005/0040147 A1* | 2/2005 | Hoebel ................ B23K 26/032 219/121.64 |
| 2006/0032840 A1* | 2/2006 | Bagavath-Singh ... B22F 3/1055 219/121.64 |
| 2006/0054079 A1* | 3/2006 | Withey ................... C30B 13/24 117/108 |
| 2009/0283501 A1* | 11/2009 | Erikson ................. B22F 3/1055 219/76.1 |

OTHER PUBLICATIONS

M. Gäumann§, C. Bezençon, P. Canalis and W. Kurz, Single-crystal laser deposition of superalloys: processing-microstructure maps, Acta Mater. 49 pp. 1051-1062, 2001.

J. Choi, B Dutta and J. Mazumder, Spatial Control of Texture by Laser DMD process, Proceedings of TMS, vol. 1, Fabrication, Materials Processing and Properties, 2009.

International Search Report and Written Opinion of the International Searching Authority for PCT/US2015/046531, dated Oct. 29, 2015.

* cited by examiner

APPARATUS AND METHOD FOR DIRECT WRITING OF SINGLE CRYSTAL SUPER ALLOYS AND METALS

CROSS-REFERENCE TO RELATED APPLICATIONS

This application is a U.S. National Phase Application under 35 U.S.C. 371 of International Application No. PCT/US2015/046531, filed on Aug. 24, 2015 and published in English as WO 2016/032953 on Mar. 3, 2016. This application claims the benefit of U.S. Provisional Application No. 62/041,884, filed on Aug. 26, 2014. The entire disclosures of the above applications are incorporated herein by reference.

GOVERNMENT INTEREST

This invention as made with government support under 70NANB15H022 awarded by the National Institute of Standards and Technology. The government has certain rights in the invention.

FIELD

The present disclosure relates to apparatus and method for direct writing of single crystal super alloys and metals.

BACKGROUND AND SUMMARY

This section provides background information related to the present disclosure which is not necessarily prior art. This section further provides a general summary of the disclosure, and is not a comprehensive disclosure of its full scope or all of its features.

Airfoil components, such as blades and vanes, are often formed of equiaxed, directionally solidified (DS), or single crystal (SX) superalloys. Directionally solidified (DS) or single-crystal (SX) turbine airfoils have far superior creep strength, thermal fatigue resistance as well as corrosion resistance when compared to equiaxed crystal counterparts. In particular uses, DS or SX turbine airfoils have proven to have as much as nine times more relative life in terms of creep strength and thermal fatigue resistance and over three times more relative life for corrosion resistance, when compared to equiaxed crystal counter parts.

However, single crystal casting is a slow and expensive process. In the event of a change in design, a new mold has to be fabricated. Due to high melting temperature of the Nickel superalloy, often expensive ceramic molds are required. On the other band, digital manufacturing methods, if successfully applied, can make a single crystal without a mold and thus enable design change economic.

According to the principles of the present teachings, methods and apparatus are disclosed for direct writing of single crystal super alloys and metals. In one embodiment, a substrate is heated to a predetermined temperature below its melting point, and a laser is used to form a melt pool on a surface of a substrate. The substrate is positioned on a base plate, and the laser and the base plate are movable relative to each other, with the laser being used for direct metal deposition and the substrate is heated to a temperature below its melting point. A superalloy powder is introduced to the melt pool, and the temperature of the melt pool is controlled to maintain a predetermined thermal gradient on a solid and liquid interface of the melt pool so as to form a single crystal deposit on the substrate.

In accordance with this method, an apparatus is provided for direct writing of single crystal super alloys and metals. In one embodiment, the apparatus comprises a laser having a power output; a base plate configured for holding a substrate thereon, a DMD bead configured to supply a stream of superalloy powder onto the substrate, an induction heating source positioned to heat the substrate on the base plate to a predetermined temperature, and a controller for controlling the power output of the laser to maintain the predetermined temperature. The controller is responsive to a measured temperature of at least one of a melt pool on the substrate and the superalloy powder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
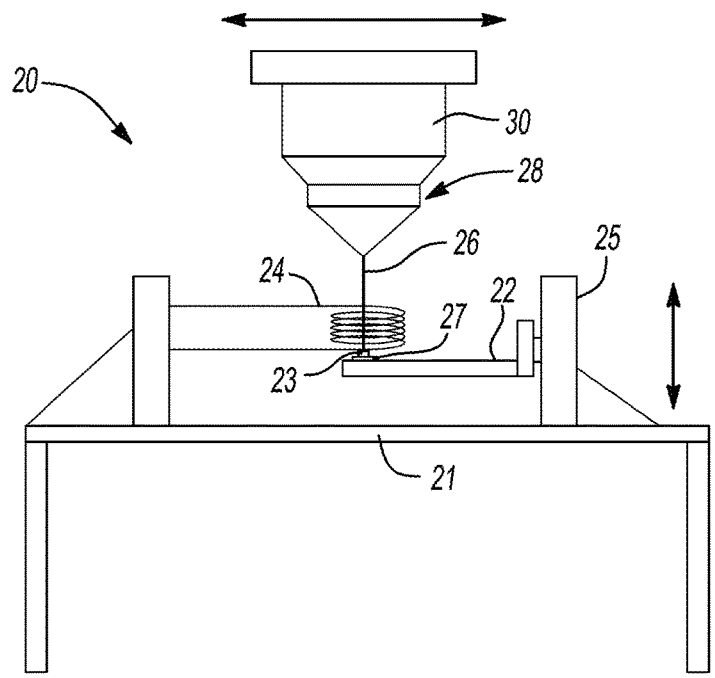
FIG. 1 illustrates an experimental setup according to one embodiment.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Direct Metal Deposition (DMD), a digital additive manufacturing process, uses an intelligent closed-loop feedback system to provide an economical solution for advanced Gas Turbine Technology. Methods and apparatus are generally provided herein for the direct writing of three dimensional single crystals shapes facilitated by maintaining the temperature gradient at the solid liquid interface within a very narrow window close to being a constant.

Such three dimensional single crystal shapes have a particular utility as a blade of a gas turbine engine. However, it should be understood that the teachings of the present disclosure should not be regarded as being limited to only gas turbine blade application, but may find utility in a wide range of application. That is, the use of exemplary alloy compositions discussed herein is not limited to a gas turbine blade, and thus may be employed in other articles such as gas turbine nozzles, vanes, shrouds, or other components for gas turbine engines or similar applications.

In an exemplary embodiment, the component article 10 is substantially a single crystal. That is, the component article 10 is at least about 80 percent by volume, and more preferably at least about 95 percent by volume, a single grain with a single crystallographic orientation. There may be minor volume fractions of other crystallographic orientations and also regions separated by low-angle boundaries. The single-crystal structure is prepared by the directional solidification of an alloy composition, usually from a seed or other structure that induces the growth of the single crystal and single grain orientation.

Referring to FIG. 1, an apparatus 20 is generally shown for providing a stable temperature gradient and environment for SX growth using a process similar to the floating zone method. The apparatus 20 generally includes a worktable 21 with which other components are arranged. A single crystal base plate 22 is used to initiate epitaxial growth. A single-crystal substrate 23 is shown positioned on a platform 27 on the single-crystal base plate 22. The single-crystal base plate 22 is movable in the vertical direction with respect to the apparatus 20. As shown, a linear motion stage 25 is positioned on the work table 21 to control the vertical movement of the single-crystal base plate 22.

In one embodiment, the substrate is a single-crystal seed having substantially the same composition as the deposit. For example, both the substrate and the material deposited can be a nickel-based super alloy.

An induction heat source 24 is introduced in order to maintain a steady temperature gradient on the single-crystal substrate 23. As shown, the induction heat source 24 is a heating coil that is static with respect to the apparatus 20. As such, the single-crystal base plate 22 can be moved vertically with respect to the induction heating source 24 to control the distance of the single-crystal substrate 23 from the induction heating source 24. When positioned on the platform 27, the substrate 23 can be positioned within the induction heat source 24.

A laser 26 is shown exiting a DMD head 28 for growing a single-crystal on the single-crystal substrate 23. As shown, a 4 kW laser 26 is used for forming single crystal Ni-based superalloy specimens. However, any laser or heat source, such as electron beam, with enough power to melt metal powder will be adequate for the process. The experiments described in the embodiment shown only uses few hundred watts out of 4 KW. The DMD head 28 is movable in the horizontal plane, in both the X and Y axis, to allow control of the location of the laser 26. Thus, the apparatus 10 allows for a 3-axis motion stage for forming single crystal specimens.

Figure 2:
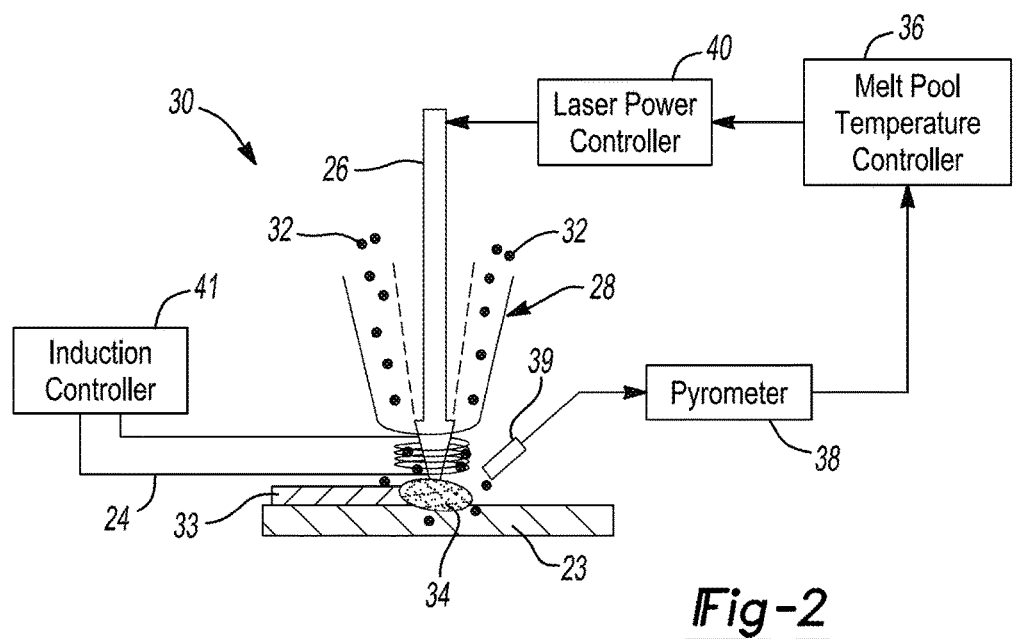
FIG. 2 illustrates a melt pool temperature control process according to one embodiment.

As more particularly shown in FIG. 2, the DMD head 28 utilizes a DMD powdered metal delivery system 30 for flowing or delivering a superalloy powder 32 to the melt pool 34 generated by the laser 26. In one embodiment, the superalloy powder 32 includes a nickel-based superalloy powder. However, any suitable superalloy can be included in the powder 32 as desired.

By using the induction heating source 24, the temperature of the single crystal substrate 23 is increased to near melting temperature (e.g., about 1200° C. when the substrate 23 is a Ni-based superalloy). The induction heating source 24 helps to maintain the thermal gradient on the solid and liquid interface.

The powder 32 is then deposited onto the single crystal substrate 23 when a melt pool 34 is formed from the clad 33 due to the addition of the laser 26 contacting the powder 32 and the substrate 23. That is, the addition of energy from the laser 26 raises the local temperature of the powder 32 and the single-crystal substrate 23 to form the melt pool 34.

The cladding is a composition similar to the composition of the substrate. The metal powder is generally gas-atomized metal powder of a suitable size and chemical composition for achieving the desired chemistry in the cladding.

In a particular embodiment, the deposition atmosphere is formed from an inert gas (e.g., Ar, He, $N_2$, etc.) for oxidation protection. For example, an inert gas can flow through the deposition chamber (not shown) containing the apparatus 10.

Referring to FIG. 2, a melt pool temperature controller 36 is generally shown. The melt pool temperature controller 36 is configured to maintain a substantially constant melt pool temperature, maintaining the thermal gradient on the solid and liquid interface. A pyrometer 38 and its lens 39 measure a temperature of the melt pool 34 and send an analog signal to the controller 36. The controller 36 processes converting the analog signal to actual temperature of the melt pool 34 and compares between the temperatures of melt pool 34 and a reference temperature, which gives the best quality of deposition.

If the temperature of melt pool 34 is higher than the reference temperature, the controller 36 sends a lower voltage of a signal to the laser power controller 40 to decrease the laser power. Controller 36 may also, in addition or separately, send a lower voltage of a signal to the induction heating controller 41. In case the melt pool temperature is lower than the reference temperature, the controller 36 increases a laser power and/or induction power. As the crystal grows, the lower part will begin to cool since laser heat source is farther away, resulting in perturbation of the solid-liquid interface temperature gradient. The induction heating source 24 rectifies this problem.

Figure 3:
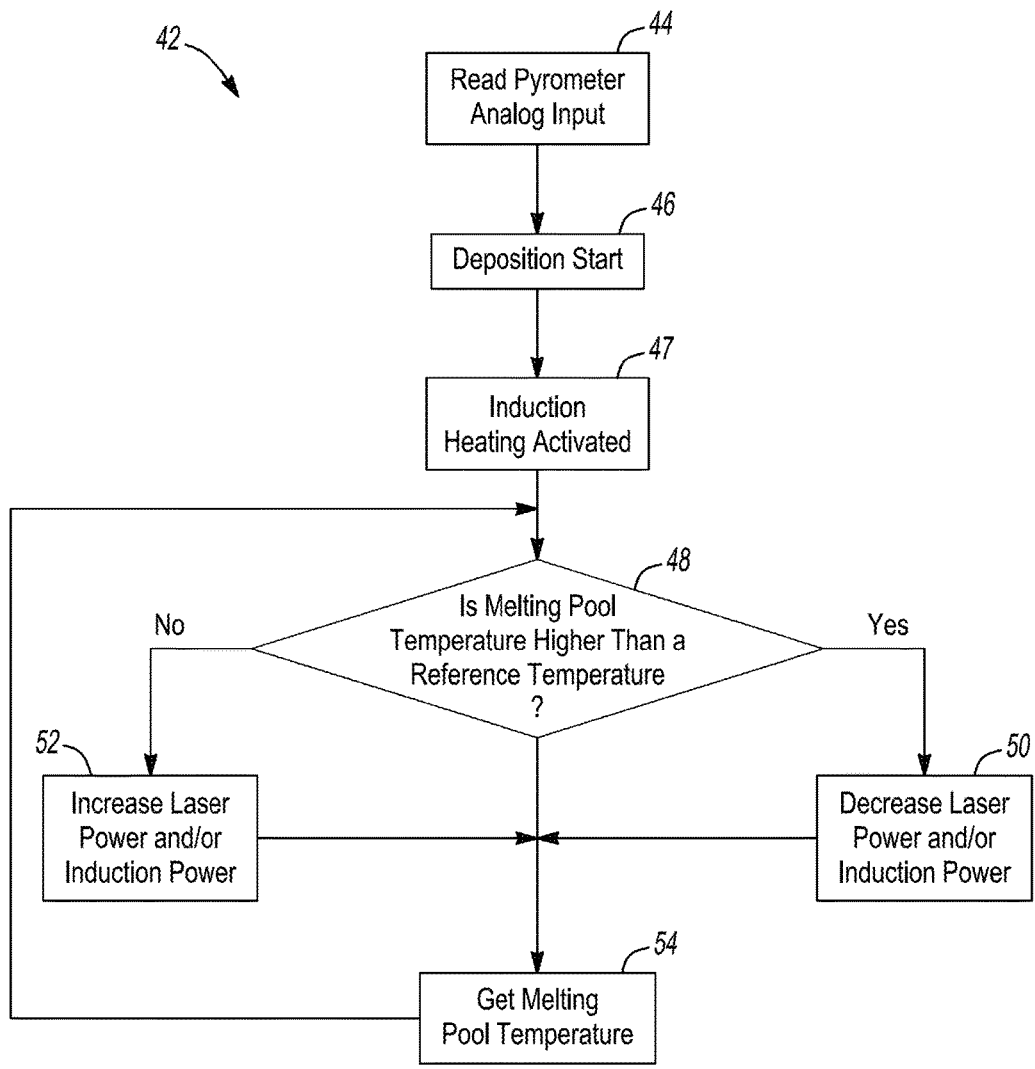
FIG. 3 is a flow chart of an algorithm for the melt pool temperature controller according to one embodiment.

FIG. 3 shows an exemplary method 42 for use by the controller 36. At 44, the pyrometer analog input is read to determine the temperature of the melt pool. At 46, the deposition process starts. At 47, the induction heat source 24 is activated. At 48, the melting pool temperature is compared to the reference temperature. If the melting point temperature is higher than the reference temperature, then a signal is sent to the laser power controller 40 and/or the induction power controller 41 to decrease the laser power and/or induction power, respectively, at 50. Conversely, if the melting point temperature is lower than the reference temperature, then a signal is sent to the laser power controller 40 and/or the induction power controller 41 to increase the laser power and/or induction power, respectively, at 52. At 54, the melting pool temperature is measured, and the process repeats. Thus, the melting pool temperature can be controlled in real-time during deposition.

In one embodiment, the controller 36, the laser power controller 40, and/or induction power controller 41 may comprise a computer or other suitable processing unit. Thus, in several embodiments, the controller 36 may include suitable computer-readable instructions that, when implemented, configure the controller 36 to perform various different functions, such as receiving, transmitting and/or executing laser power output control signals.

A computer generally includes a processor(s) and a memory. The processor(s) can be any known processing device. Memory can include any suitable computer-readable medium or media, including, but not limited to, RAM, ROM, hard drives, flash drives, or other memory devices. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory can also include data that may be retrieved, manipulated, or stored by processor(s). For instance, after receiving the temperature measured from the pyrometer, memory can store the temperature information. Additionally, memory can store reference temperatures for various substrate materials and/or powder materials.

The computing device can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with the pyrometer and/or the laser power controller.

Growth rate of the single crystal is dependent on the temperature gradient in the solid as shown in the Equation 1:

$$R_{max}=(K_s \cdot G_s)/(p_s \cdot H)$$

where: $R_{max}$ is the maximum crystal growth rate, $K_s$ is the thermal conductivity of the solid deposited crystal, $G_s$ is the temperature gradient at the solid-liquid interface, $P_s$ is the solid density, and H is the latent heat of fusion. It should be noted that $K_s$, $P_s$ and H are materials properties and cannot be controlled by the process, but $G_s$ can be. Therefore, combined Laser and Induction heating provides additional parameters to increase the growth rate.

The present teachings thereby remove the need for an expensive mold for growing single crystal and thus the lead time from concept to realization. Thus, the dual heating system provides the process flexibility and route to increase the productivity. It is anticipated that, in some embodiments, alternative heat sources, other than Laser and Induction, can be used. Such alternative heat sources can include Electron Beam, Plasma arc, electric arc, resistive heating etc. However, a revised control algorithm may be required for the particular heat source used.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for direct writing of single crystal alloys, the method comprising:
    heating a single crystal seed substrate using a heat source to a predetermined temperature below its melting point;
    using a laser separate from the heat source to form a melt pool on a surface of the single crystal seed substrate, wherein the single crystal seed substrate is positioned on a base plate, and wherein the laser and the base plate are movable relative to each other, the laser being used for direct metal deposition;
    introducing a superalloy powder to the melt pool, the single crystal seed substrate having substantially the same composition as the superalloy powder; and
    controlling the temperature of the melt pool and the single crystal seed substrate using the heat source and the laser to maintain a predetermined thermal gradient at a solid and liquid interface of the melt pool so as to form a single crystal deposit on the single crystal seed substrate, the heat source maintaining a temperature of the single crystal deposit away from the laser.

2. The method of claim 1, wherein the laser has a variable power source and the heating source has a variable power source, and wherein controlling the temperature of the melt pool using the heat source and the laser comprises adjusting the variable power source of the laser and the variable power source of the heating source.

3. The method of claim 1, wherein the laser has a variable power output controllable by a laser power controller and the heating source has a variable power output controlled by a heating source controller, and wherein controlling the temperature of the solid and liquid interface of the melt pool comprises:
    measuring the temperature of the melt pool;
    receiving the temperature measured at a controller;
    comparing the temperature measured to a reference temperature; and
    adjusting the variable power output of the laser and the variable power output of the heating source.

4. The method of claim 3, wherein the temperature measured is lower than the reference temperature, and wherein adjusting the variable power output of the laser and the variable power output of the heating source comprises increasing the variable power output of the laser and increasing the variable power output of the heating source.

5. The method of claim 4, wherein increasing the variable power output of the laser comprises increasing the voltage supplied by the laser power controller, and wherein increasing the variable power output of the heating source comprises increasing the voltage supplied by the heating source controller.

6. The method of claim 3, wherein the temperature measured is higher than the reference temperature, and wherein adjusting the variable power output of the laser and the variable power output of the heating source comprises decreasing the variable power output of the laser and decreasing the variable power output of the heating source.

7. The method of claim 6, wherein decreasing the variable power output of the laser comprises decreasing the voltage supplied by the laser power controller.

8. The method of claim 1, wherein the laser and the base plate are movable in three directions with respect to each other.

9. The method of claim 1, further comprising:
moving the laser in a horizontal plane with respect to the substrate.

10. The method of claim 1, further comprising:
moving the base plate in a vertical direction with respect to the laser.

11. An apparatus for direct writing of single crystal alloys comprising:
a laser having a power output;
a base plate configured for holding a single-crystal seed substrate thereon;
a head configured to supply a stream of superalloy powder onto the substrate;
an induction heating source positioned to heat the single-crystal seed substrate on the base plate to a predetermined temperature; and
a controller configured to control the power output of the laser and the induction heating source to maintain the predetermined temperature of the base plate and a melt pool on the substrate, wherein the controller is configured to be responsive to a measured temperature of at least one of the melt pool on the substrate and the superalloy powder.

12. The apparatus of claim 11, further comprising:
a pyrometer configured to measure the temperature of the at least one of the melt pool on the substrate and the superalloy powder.

13. The apparatus of claim 12, wherein the pyrometer is in communication with the controller.

14. The apparatus of claim 13, wherein the laser and the induction heating source have a variable power output controlled by the controller.

15. The apparatus of claim 14, wherein the controller is a laser controller and an induction heating source controller.

16. The apparatus of claim 11, wherein the laser passes through the DMD head onto the substrate to form a melt pool.

17. The apparatus of claim 11, wherein the laser and the base plate are movable in three directions with respect to each other.

18. The apparatus of claim 11, wherein the laser is movable in a horizontal plane with respect to the substrate.

19. The apparatus of claim 11, wherein the base plate is movable in a vertical direction with respect to the laser.

* * * * *